United States Patent
Wentink (10) Patent No.: US 9,118,473 B2
(45) Date of Patent: Aug. 25, 2015

(54) EFFICIENT MULTI-USER MULTIPLE INPUT MULTIPLE OUTPUT (MU-MIMO)

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 13/420,339

(22) Filed: Mar. 14, 2012

(65) Prior Publication Data

US 2013/0070670 A1  Mar. 21, 2013

Related U.S. Application Data

(60) Provisional application No. 61/452,894, filed on Mar. 15, 2011.

(51) Int. Cl.
| | |
|---|---|
| *H04L 1/16* | (2006.01) |
| *H04L 1/00* | (2006.01) |
| *H04B 7/06* | (2006.01) |
| *H04B 7/04* | (2006.01) |
| *H04L 25/02* | (2006.01) |
| *H04L 25/03* | (2006.01) |

(Continued)

(52) U.S. Cl.
CPC ............ *H04L 1/1671* (2013.01); *H04L 1/0026* (2013.01); *H04L 1/0031* (2013.01); *H04L 1/1685* (2013.01); *H04L 2001/0093* (2013.01)

(58) Field of Classification Search
CPC .......................... H04B 7/0626; H04L 1/1621
USPC .............. 370/242, 252, 310, 310.2, 328–330, 370/394
See application file for complete search history.

(56) References Cited

U.S. PATENT DOCUMENTS

| | | |
|---|---|---|
| 8,254,244 B2 | 8/2012 | Montojo et al. |
| 8,477,779 B1 | 7/2013 | Colloff et al. |
| 8,681,815 B1 | 3/2014 | Liu et al. |

(Continued)

FOREIGN PATENT DOCUMENTS

| | | |
|---|---|---|
| EP | 2109243 A1 | 10/2009 |
| JP | 2006094484 A | 4/2006 |

(Continued)

OTHER PUBLICATIONS

IEEE 802.11-2007, "IEEE Standard for Information Technology—Telecommunications and Information Exchange Between Systems—Local and Metropolitan Area Networks—Specfic Requirements", Part 11: Wireless LAN Medium Access Control (MAC) and Physical Layer (PHY) Specifications, (Jun. 12, 2007).

(Continued)

*Primary Examiner* — Un C Cho
*Assistant Examiner* — Peian Lou
(74) *Attorney, Agent, or Firm* — Dang M. Vo (57) ABSTRACT

Certain aspects of the present disclosure provide techniques and apparatus for combining the data (e.g., the channel station information (CSI) and the block acknowledgment (BA)) from one or more stations (STAs) capable of multi-user (MU) transmission in an effort to reduce the number of frames involved in a MU frame exchange. For certain aspects, the BA frames may be moved before a MU transmission and combined with the CSI frames, thereby effectively acknowledging a prior MU transmission. By reducing the number of frames involved, the efficiency of MU exchanges may be increased.

34 Claims, 8 Drawing Sheets

(51) Int. Cl.
*H04W 74/06* (2009.01)
*H04L 5/00* (2006.01)

(56) References Cited

U.S. PATENT DOCUMENTS

| | | | |
|---|---|---|---|
| 2006/0248429 A1* | 11/2006 | Grandhi et al. | 714/749 |
| 2007/0230373 A1* | 10/2007 | Li et al. | 370/267 |
| 2008/0062948 A1 | 3/2008 | Ponnuswamy | |
| 2010/0014434 A1 | 1/2010 | Reznik et al. | |
| 2010/0075703 A1 | 3/2010 | Imai et al. | |
| 2010/0177755 A1 | 7/2010 | Chu et al. | |
| 2010/0322166 A1 | 12/2010 | Sampath et al. | |
| 2011/0038332 A1 | 2/2011 | Liu et al. | |
| 2011/0069648 A1* | 3/2011 | Lee et al. | 370/310 |
| 2011/0090855 A1 | 4/2011 | Kim | |
| 2011/0128947 A1* | 6/2011 | Liu et al. | 370/338 |
| 2011/0150004 A1 | 6/2011 | Denteneer et al. | |
| 2011/0188598 A1 | 8/2011 | Lee et al. | |
| 2011/0194644 A1 | 8/2011 | Liu et al. | |
| 2011/0205968 A1* | 8/2011 | Kim et al. | 370/328 |
| 2011/0222478 A1 | 9/2011 | Lee et al. | |
| 2011/0235593 A1 | 9/2011 | Gong et al. | |
| 2011/0261708 A1 | 10/2011 | Grandhi | |
| 2011/0261742 A1 | 10/2011 | Wentink | |
| 2011/0286377 A1 | 11/2011 | Sampath et al. | |
| 2012/0218982 A1 | 8/2012 | Lee et al. | |
| 2013/0058273 A1 | 3/2013 | Wentink et al. | |

FOREIGN PATENT DOCUMENTS

| | | |
|---|---|---|
| JP | 2007166464 A | 6/2007 |
| JP | 2008527838 A | 7/2008 |
| JP | 2010166401 A | 7/2010 |
| JP | 2011019262 A | 1/2011 |
| WO | WO2008024544 A2 | 2/2008 |
| WO | WO2008027672 A2 | 3/2008 |
| WO | 2008093619 A1 | 8/2008 |
| WO | 2009058809 | 5/2009 |
| WO | 2009113834 A2 | 9/2009 |
| WO | WO2009158545 A2 | 12/2009 |
| WO | 2011005004 A2 | 1/2011 |
| WO | 2011025769 A1 | 3/2011 |

OTHER PUBLICATIONS

IEEE P802. 11ac/D0.1, Draft Standard for Information Technology—Telecommunications and information exchange between systems—Local and metropolitan area networks—Specific requirements Part 11 : Wireless LAN Medium Access Control (MAC) and Physical Layer (PHY) specifications. Amendment 5: Enhancements for Very High Throughput for Operation in Bands below 6 GHz, Jan. 2011, pp. 1-193.

IEEE P802. 11z/D7.0, Draft Standard for Information Technology—Telecommunications and information exchange between systems—Local and metropolitan area networks—Specific requirements—Part 11: Wireless LAN Medium (MAC) and Physical Layer (PHY) specifications, Amendment 6: Extensions to Direct Link Setup (DLS) (2010).

International Search Report and Written Opinion—PCT/US2012/029219—ISA/EPO—May 25, 2012.

Park J., et al., "802.11ac Mac Frame Length Indication", IEEE 802.11-10/0358r1, May 18, 2010, pp. 1-9.

Zhang H., et al., "802.11ac Preamble", IEEE 802.11-10/0070r5, Mar. 15, 2010, pp. 1-28.

* cited by examiner

EFFICIENT MULTI-USER MULTIPLE INPUT MULTIPLE OUTPUT (MU-MIMO)

CROSS-REFERENCE TO RELATED APPLICATIONS

This application claims benefit of U.S. Provisional Patent Application Ser. No. 61/452,894, filed Mar. 15, 2011, which is herein incorporated by reference.

BACKGROUND

1. Field of the Invention

Certain aspects of the present disclosure generally relate to wireless communications and, more particularly, to reducing the number of frames involved in a multi-user (MU) frame exchange.

2. Relevant Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into a number ($N_S$) of independent channels, which are also referred to as spatial channels or spatial streams, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single access point (AP) and multiple user stations (STAs), concurrent transmissions may occur on multiple channels toward different stations, both in the uplink and downlink direction. Many challenges are present in such systems.

SUMMARY

Certain aspects of the present disclosure generally apply to a wireless local area network (WLAN) where an access point (AP) has data to send to a plurality of other stations (STAs). By using the Spatial Division Multiple Access (SDMA) technique, for example, an AP may simultaneously send data towards multiple STAs. Certain aspects of the present disclosure generally relate to reducing the number of frames involved in a multi-user multiple-input multiple-output (MU-MIMO) frame exchange, thereby increasing efficiency.

Certain aspects of the present disclosure provide an apparatus for wireless communications. The apparatus generally includes a receiver and a transmitter. The receiver is typically configured to receive first and second multi-user (MU) packets. The transmitter is typically configured to transmit, after the receiver had received the first MU packet and before the receiver has received the second MU packet, an acknowledgment associated with the first MU packet together with information about a channel over which the second MU packet is expected to be received.

Certain aspects of the present disclosure provide a method for wireless communications. The method generally includes receiving a first MU packet; receiving a second multi-user (MU) packet; and transmitting, after receiving the first MU packet and before receiving the second MU packet, an acknowledgment associated with the first MU packet together with information about a channel over which the second MU packet is expected to be received.

Certain aspects of the present disclosure provide a first apparatus for wireless communications. The first apparatus generally includes means for receiving first and second multi-user (MU) packets; and means for transmitting, after the means for receiving had received the first multi-user (MU) packet and before the means for receiving has received the second MU packet, an acknowledgment associated with the first MU packet together with information about a channel over which the second MU packet is expected to be received.

Certain aspects of the present disclosure provide a computer-program product for wireless communications. The computer-program product generally includes a computer-readable medium having instructions executable to receive a first MU packet; to receive a second MU packet; and to transmit, after receiving the first MU packet and before receiving the second MU packet, an acknowledgment associated with the first MU packet together with information about a channel over which the second MU packet is expected to be received.

Certain aspects of the present disclosure provide a wireless node. The wireless node generally includes at least one antenna, a receiver, and a transmitter. The receiver is typically configured to receive, via the at least one antenna, first and second multi-user (MU) packets. The transmitter is typically configured to transmit, via the at least one antenna after the receiver had received the first MU packet and before the receiver has received the second MU packet, an acknowledgment associated with the first MU packet together with information about a channel over which the second MU packet is expected to be received.

Certain aspects of the present disclosure provide a first apparatus for wireless communications. The first apparatus generally includes a transmitter and a receiver. The transmitter is typically configured to transmit first and second MU packets to one or more second apparatuses. The receiver is typically configured to receive, from at least one of the second apparatuses after the transmitter had transmitted the first MU packet and before the transmitter has transmitted the second MU packet, an acknowledgment associated with the first MU packet together with information about a channel over which the second MU packet is expected to be transmitted.

Certain aspects of the present disclosure provide a method for wireless communications. The method generally includes transmitting, from a first apparatus, first and second multi-user (MU) packets to one or more second apparatuses; and receiving, from at least one of the second apparatuses after transmitting the first MU packet and before transmitting the second MU packet, an acknowledgment associated with the first MU packet together with information about a channel over which the second MU packet is expected to be transmitted.

Certain aspects of the present disclosure provide a first apparatus for wireless communications. The first apparatus generally includes means for transmitting first and second MU packets to one or more second apparatuses; and means for receiving, from at least one of the second apparatuses after the means for transmitting had transmitted the first MU packet and before the means for transmitting has transmitted the second MU packet, an acknowledgment associated with the first MU packet together with information about a channel over which the second MU packet is expected to be transmitted.

Certain aspects of the present disclosure provide a computer-program product for wireless communications. The computer-program product generally includes a computer-readable medium having instructions executable to transmit, from a first apparatus, first and second MU packets to one or more second apparatuses; and to receive, from at least one of the second apparatuses after transmitting the first MU packet and before transmitting the second MU packet, an acknowledgment associated with the first MU packet together with information about a channel over which the second MU packet is expected to be transmitted.

Certain aspects of the present disclosure provide an access point. The access point generally includes at least one antenna, a transmitter, and a receiver. The transmitter is typically configured to transmit, via the at least one antenna, first and second MU packets to one or more apparatuses. The receiver is typically configured to receive, from at least one of the apparatuses via the at least one antenna after the transmitter had transmitted the first MU packet and before the transmitter has transmitted the second MU packet, an acknowledgment associated with the first MU packet together with information about a channel over which the second MU packet is expected to be transmitted.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support the Institute of Electrical and Electronics Engineers (IEEE) 802.11n or earlier amendments to the IEEE 802.11 standard.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to a different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point (AP) may comprise, be implemented as, or known as a Node B, Radio Network Controller (RNC), evolved Node B (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

An access terminal (AT) may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol (SIP) phone, a wireless local loop (WLL) station, a personal digital assistant (PDA), a handheld device having wireless connection capability, a station (STA), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

Figure 1:
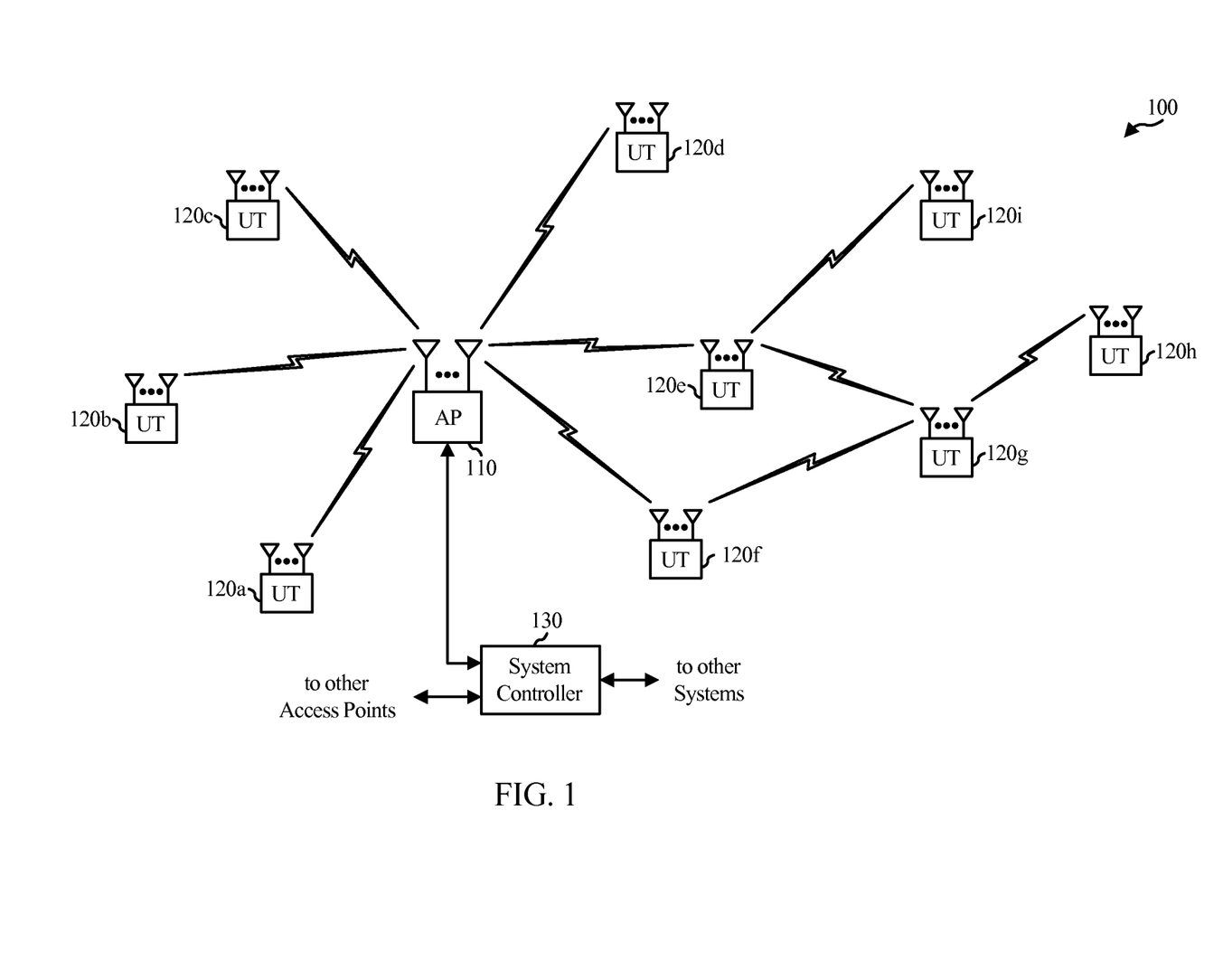
FIG. 1 illustrates a diagram of a wireless communications network in accordance with certain aspects of the present disclosure.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a station (STA), a client, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to a different user terminal 120.

Figure 2:
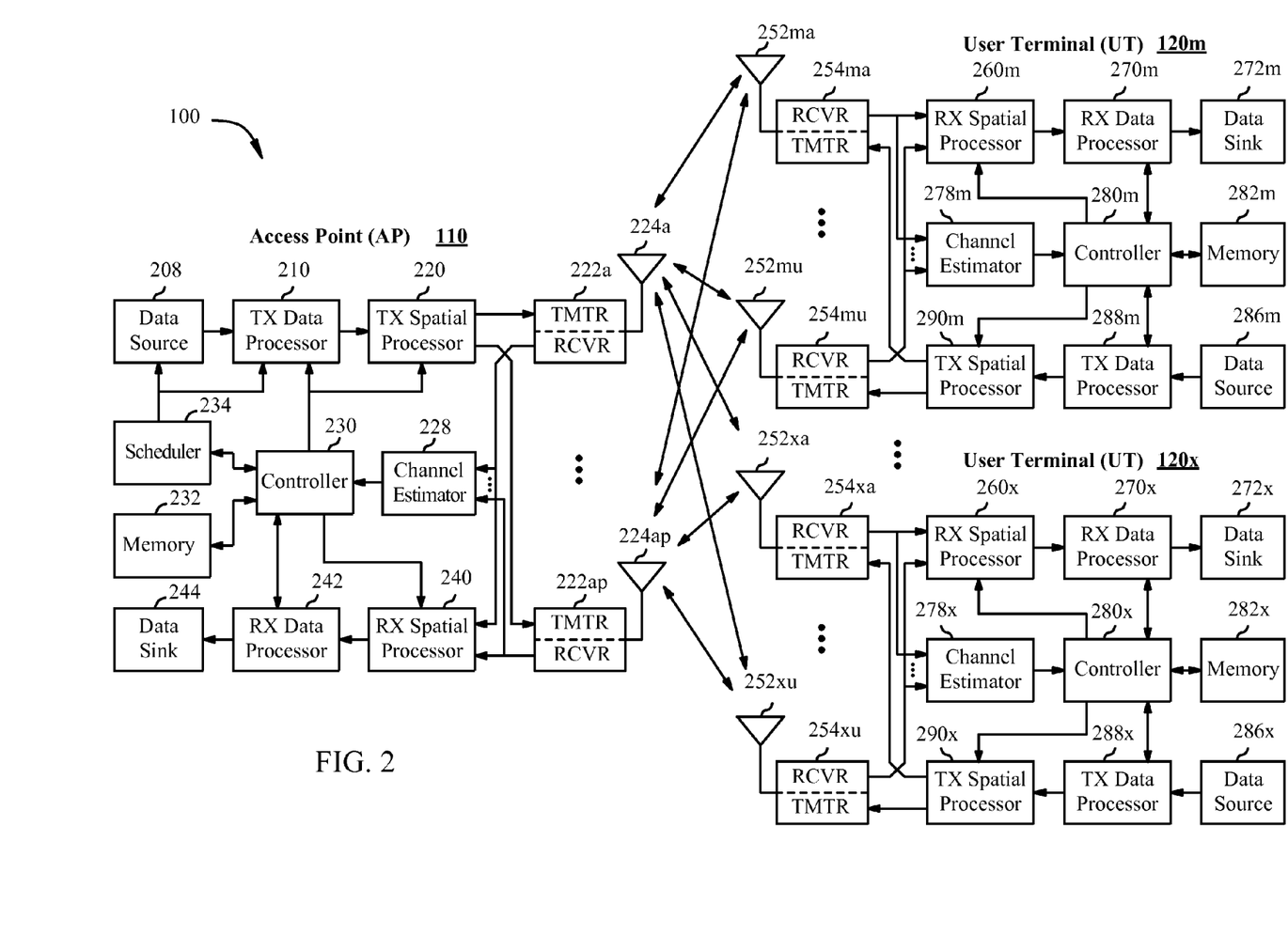
FIG. 2 illustrates a block diagram of an example access point (AP) and user terminals in accordance with certain aspects of the present disclosure.

FIG. 2 illustrates a block diagram of access point 110 and two user terminals 120m and 120x in MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{S_{up,m}\}$. A TX spatial processor 290 performs spatial processing on the data symbol stream $\{S_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream $\{S_{up,m}\}$ transmitted by a respective user terminal An RX data processor 242 processes (e.g., demodulates, deinterleaves, and decodes) each recovered uplink data symbol stream $\{S_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as precoding or beamforming) on the $N_{dn}$ downlink data symbol streams and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves, and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

In next generation WLANs, such as the MIMO system 100 from FIG. 1, downlink DL) multi-user (MU) MIMO transmission may represent a promising technique to increase overall network throughput. In most aspects of a DL MU-MIMO transmission, a non-beamformed portion of a preamble transmitted from an access point to a plurality of user stations (STAs) may carry a spatial stream allocation field indicating allocation of spatial streams to the STAs.

In order to parse this allocation information at a STA, each STA may be informed of its ordering or a STA number in a set of STAs from the plurality of STAs scheduled to receive the MU transmission. This may entail forming groups, wherein a group identifier (group ID) field in the preamble may convey, to the STAs, the set of STAs (and their order) being transmitted in a given MU transmission. With preamble bits adding to the transmission overhead, it may be desirable to expend as little bits on the group ID as possible, while not sacrificing on the flexibility with which STAs can be scheduled together in a MU-MIMO transmission at a given instant.

Efficient MU-MIMO

As described above, groups may be formed in DL MU-MIMO transmission for WLANs for conveying the spatial stream positions to STAs. MU-MIMO, as defined in IEEE 802.11ac, may be used to beamform data packets to multiple receivers in parallel. Prior to the IEEE 802.11ac amendment, data transmissions could be beamformed to individual receivers, but only sequentially and not in parallel.

Figure 3:
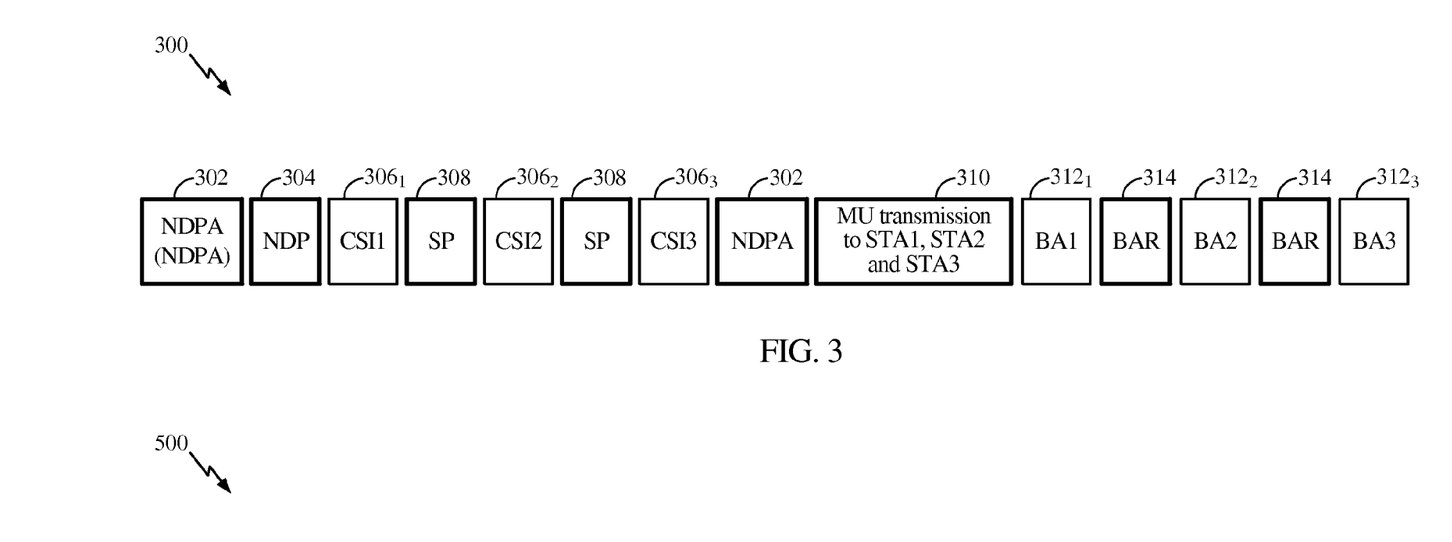
FIG. 3 illustrates an example polled multi-user (MU) frame exchange with sounding and block acknowledgment (ACK), in accordance with certain aspects of the present disclosure.

A typical multi-user (MU) frame exchange with sounding and block acknowledgment (ACK) may consist of many frames, including a null data packet announcement (NDPA) frame 302, a null data packet (NDP) frame 304, a channel state information (CSI) frame 306, a sounding poll (SP) frame 308, a MU data frame 310 for transmitting to multiple STAs, a block ACK (BA) frame 312, and a block ACK request (BAR) frame 314. FIG. 3 illustrates an example MU frame exchange 300 with sounding and block ACK based on polling, in accordance with certain aspects of the present disclosure. The MU frame exchange 300 based on polling may involve an AP 110 transmitting an NDPA frame 302 followed by an NDP frame 304. A first STA may respond to the NDP frame 304 with a CSI frame $306_1$ (e.g., CSI1). Then, the AP 110 may transmit SP frames 308, and other STAs (e.g., STA2 and STA3) may respond with CSI frames $306_2$, $306_3$ (CSI2 and CSI3) before the AP 110 transmits another NDPA frame 302 and the MU transmission 310 (to STA1, STA2, and STA3).

After receiving the MU transmission 310, the first STA may transmit a BA frame 312$_1$ (BA1) to the AP 110. Then, the AP 110 may transmit BAR frames 314, and the other STAs (e.g., STA2 and STA3) may respond with BA frames 312$_2$, 312$_3$ (BA2 and BA3).

Figure 4:
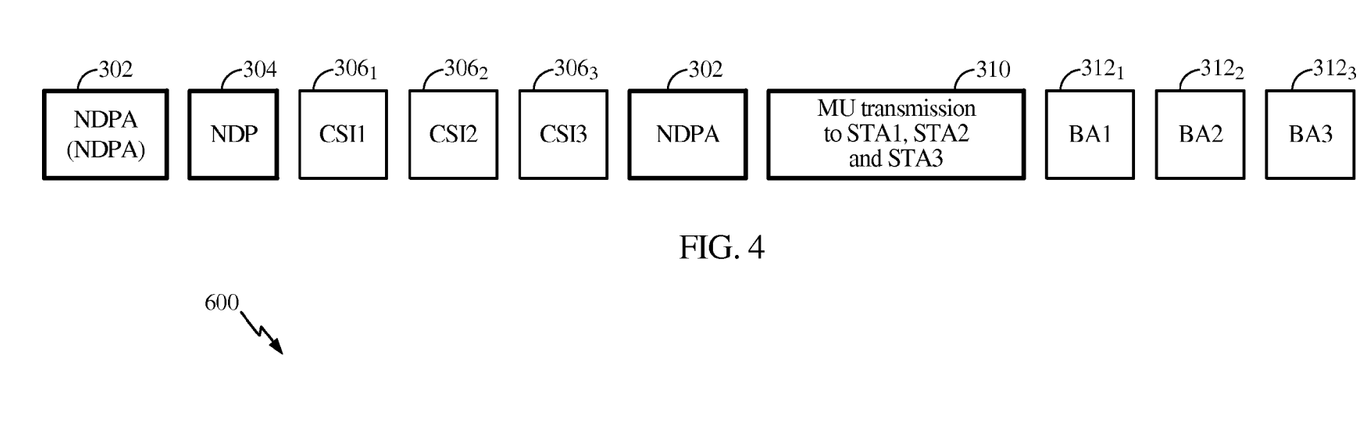
FIG. 4 illustrates an example sequential MU frame exchange with sounding and block ACK, in accordance with certain aspects of the present disclosure.

FIG. 4 illustrates an example MU frame exchange 400 with sounding and block ACK based on sequential responses, in accordance with certain aspects of the present disclosure. The MU frame exchange 400 is similar to the MU frame exchange 300 of FIG. 3. However, in the MU frame exchange 400 based on sequential responses, the other STAs (e.g., STA2 and STA3) do not wait to receive SP frames before sending CSI frames 306$_2$, 306$_3$ (CSI2 and CSI3). Likewise, the other STAs (e.g., STA2 and STA3) do not wait to receive BAR frames 314 before transmitting BA frames 312$_2$, 312$_3$ (BA2 and BA3) to the AP 110. Although three STAs (STA1, STA2, and STA3) are involved in the example MU frame exchanges 300, 400, the idea may be extended to exchanges with fewer or more STAs.

From FIGS. 3 and 4, one can observe that a single MU transmission involves many frames (14 frames for the polled sequence and 10 frames for the sequential sequence, both involving three STAs). Such straightforward MU frame exchanges (with either polling or sequential responses) are inefficient, especially as the number of STAs increases. Accordingly, what is needed are techniques and apparatus to reduce the number of frames involved in a MU frame exchange, thereby increasing efficiency of a MU frame exchange.

In an effort to reduce the number of frames involved in a MU frame exchange, the data from the STAs (e.g., the CSI and BA) may be combined and transmitted together. For certain aspects, the combined data from the STAs may be transmitted at different times within a single common frame or may be simultaneously transmitted within the common frame. To this end, the block ACK frames 312 are moved before the MU transmission (i.e., the transmission of MU data frame 310), thereby effectively acknowledging a prior MU transmission.

Figure 5:
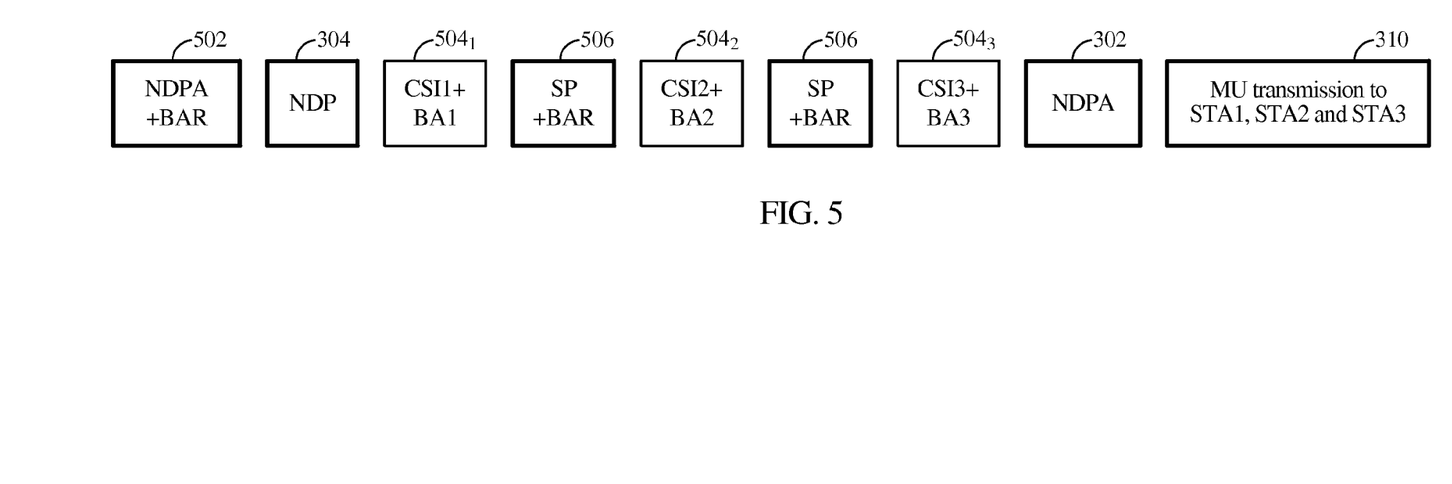
FIG. 5 illustrates an example polled MU frame exchange with combined sounding and block ACK, in accordance with certain aspects of the present disclosure.

FIG. 5 illustrates an example polled MU frame exchange 500 with combined sounding and block ACK, in accordance with certain aspects of the present disclosure. In this example, the NDPA+BAR frame 502 denotes an aggregate media access control (MAC) protocol data unit (A-MPDU) that contains an NDPA frame 302 for the current MU transmission and a BAR frame 314 for the previous MU transmission. The CSI+BA frame 504 denotes an A-MPDU that contains a CSI frame for the current MU transmission and a BA frame for the previous MU transmission. The SP+BAR frame 506 denotes an A-MPDU that contains an SP frame for the current MU transmission and a BAR frame for the previous MU transmission. The original polled MU frame exchange 300 of FIG. 3 with sounding and block ACK for three STAs has 14 frames, whereas the more efficient MU frame exchange 500 of FIG. 5 for three STAs has only 9 frames. This reduction in the number of frames may increase as the number of STAs increases.

Figure 6:
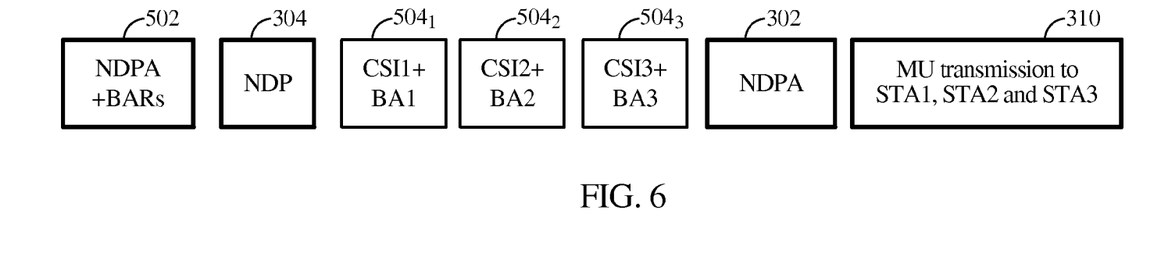
FIG. 6 illustrates an example sequential MU frame exchange with combined sounding and block ACK, in accordance with certain aspects of the present disclosure.

The number of frames in a sequential MU frame exchange may also be reduced by combining and transmitting the sounding and block ACK data together. FIG. 6 illustrates an example sequential MU frame exchange 600 with combined sounding and block ACK, in accordance with certain aspects of the present disclosure. The original sequential MU frame exchange 400 of FIG. 4 with sounding and block ACK for three STAs has 10 frames, whereas the more efficient MU frame exchange 600 of FIG. 6 for three STAs has only 7 frames. For certain aspects, the NDPA+BAR frame 502 in the sequential sequence may contain several BAR frames. For certain aspects, it is also possible that the existing BAR frames may be extended with NDPA and SP functionality.

Figure 7:
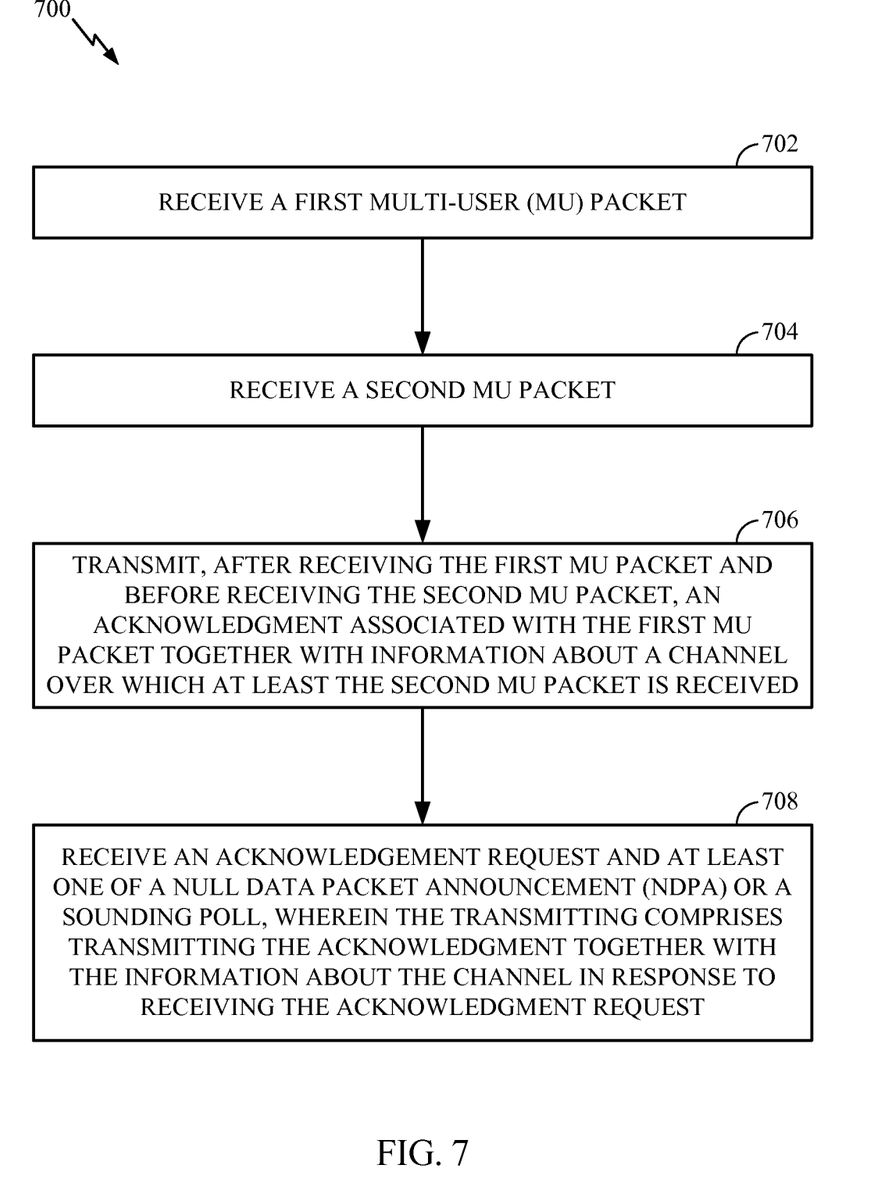
FIG. 7 illustrates example operations for more efficient MU frame exchange from the perspective of an apparatus, such as a station (STA) or user terminal, in accordance with certain aspects of the present disclosure.

FIG. 7 illustrates example operations 700 for more efficient MU frame exchange that may be performed by an apparatus, such as a STA or user terminal, in accordance with certain aspects of the present disclosure. The operations 700 may begin, at 702, with the apparatus receiving a first MU packet. At 704, the apparatus may receive a second MU packet after receiving the first MU packet.

At 706, the apparatus may transmit, after receiving the first MU packet and before receiving the second MU packet, an acknowledgment associated with the first MU packet together with information about a channel over which at least the second MU packet is received, or is at least expected to be received. According to certain aspects, the apparatus may transmit the acknowledgment together with the information about the channel based on sequential responses or polling. For certain aspects, the acknowledgment may comprise a block acknowledgment (BA), and the information about the channel may comprise channel state information (CSI). For certain aspects, the acknowledgment and the information about the channel may be transmitted in a common frame, such as an A-MPDU. For certain aspects, the first and second MU packets may be transmitted over the same channel.

At 708, the apparatus may receive (an aggregate media access control (MAC) protocol data unit (A-MPDU) comprising) an acknowledgment request and at least one of a null data packet announcement (NDPA) or a sounding poll (SP). The transmission at 706 may include transmitting the acknowledgment together with the information about the channel in response to receiving the acknowledgment request. For certain aspects, the acknowledgment request may comprise a block acknowledgment request (BAR).

Figure 8:
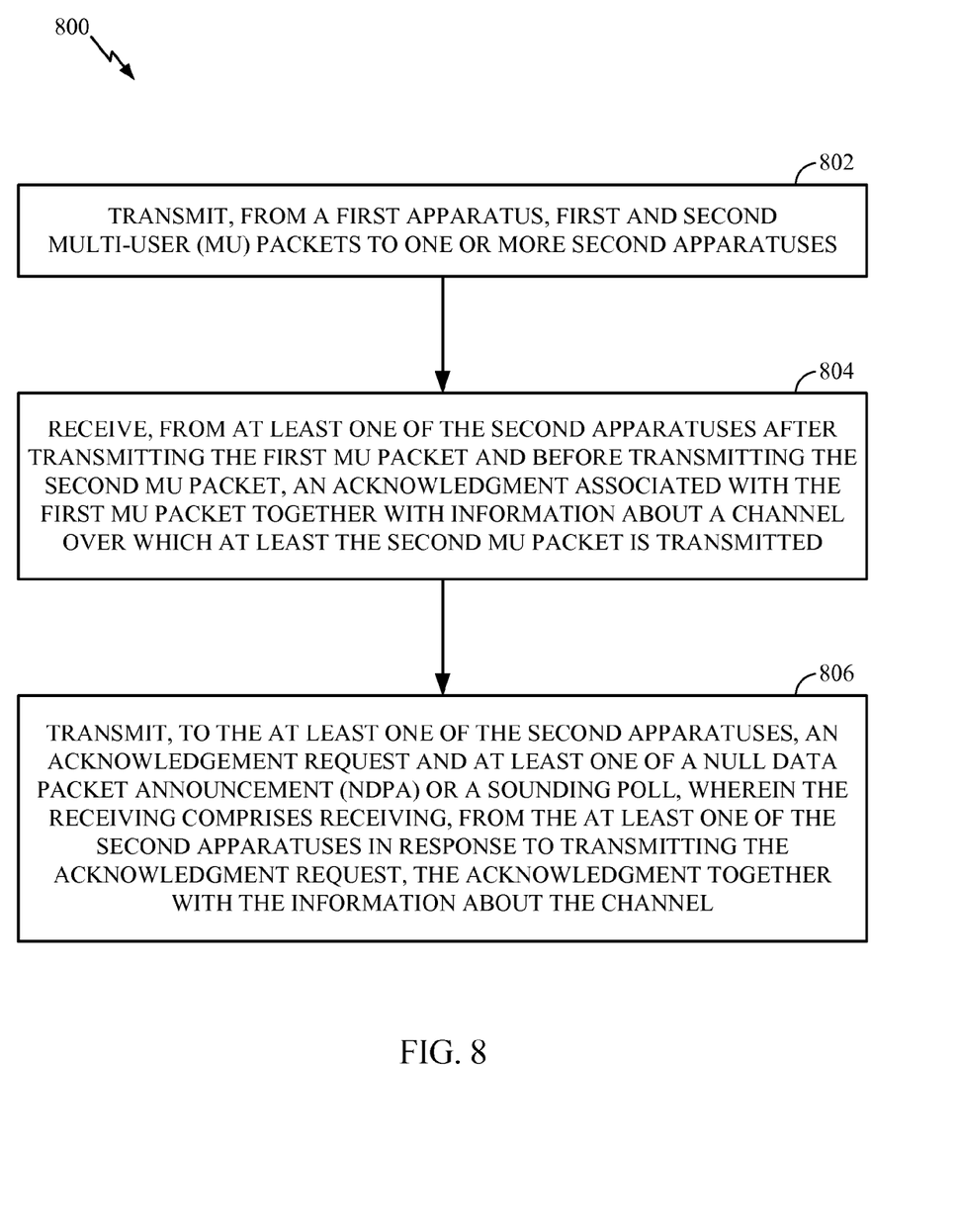
FIG. 8 illustrates example operations for more efficient MU frame exchange from the perspective of an apparatus, such as an AP, in accordance with certain aspects of the present disclosure.
Figure 8A:
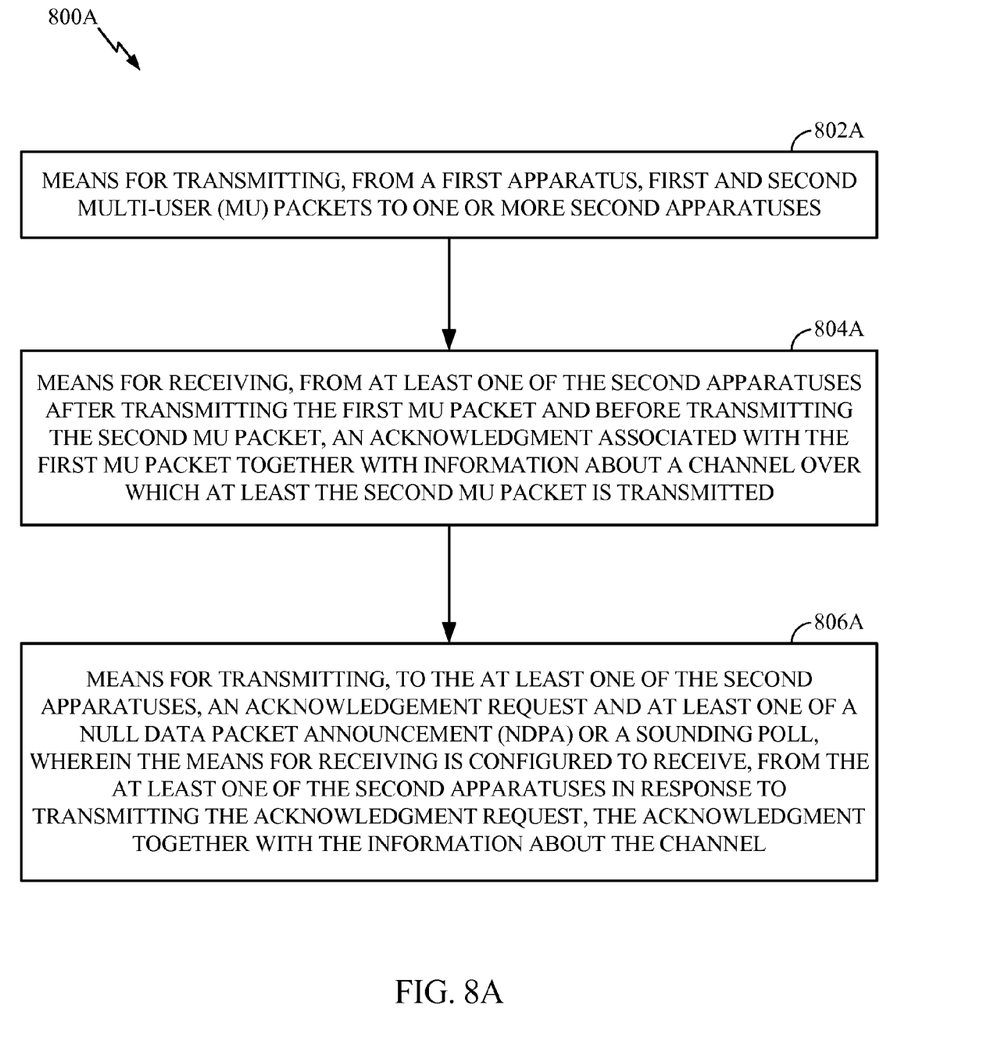
FIG. 8A illustrates example means capable of performing the operations shown in FIG. 8.

FIG. 8 illustrates example operations 800 for more efficient MU frame exchange that may be performed by a first apparatus, such as an AP, in accordance with certain aspects of the present disclosure. The operations 800 may begin, at 802, with the first apparatus transmitting first and second MU packets to one or more second apparatuses. The second apparatuses may be STAs, for example.

At 804, the first apparatus may receive, from at least one of the second apparatuses after transmitting the first MU packet and before transmitting the second MU packet, an acknowledgment associated with the first MU packet together with the information about a channel over which at least the second MU packet is transmitted, or is at least expected to be transmitted. According to certain aspects, the first apparatus may receive the acknowledgment together with the information about the channel based on sequential responses or polling. For certain aspects, the acknowledgment may comprise a block acknowledgment (BA), and the information about the channel may comprise channel state information (CSI). The CSI may contain detailed information about the channel between the sender (one of the second apparatuses) and a receiver (the first apparatus) at the level of individual subcarriers, for each pair of transmit and receive antennas. The CSI may then be used by the receiver (e.g., in an equalizer in the processing system of the receiver) to compensate, or at least adjust, for channel effects before demodulation. For certain aspects, the acknowledgment and the information about the channel may be received in a common frame, such as an A-MPDU. For certain aspects, the first and second MU packets may be transmitted over the same channel.

At 806, the first apparatus may transmit, to the at least one of the second apparatuses, (an A-MPDU comprising) an acknowledgment request and at least one of an NDPA or a sounding poll. The reception at 804 may include receiving, from the at least one of the second apparatuses in response to transmitting the acknowledgment request, the acknowledgment together with the information about the channel. For certain aspects, the acknowledgment request may comprise a block acknowledgment request (BAR).

Figure 7A:
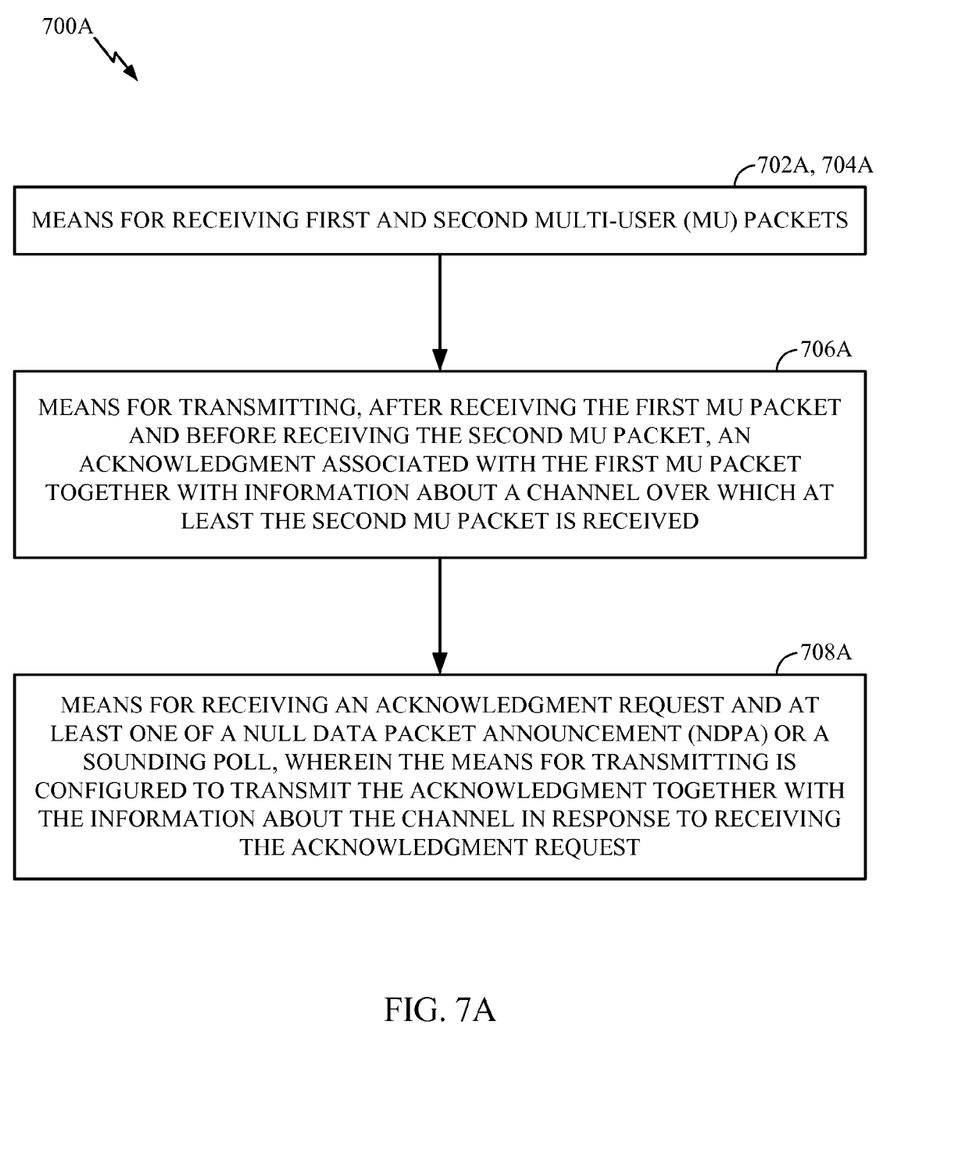
FIG. 7A illustrates example means capable of performing the operations shown in FIG. 7.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 illustrated in FIG. 7 correspond to means 700A illustrated in FIG. 7A.

For example, means for transmitting may comprise a transmitter, such as the transmitter unit 254 of the user terminal 120 depicted in FIG. 2 or the transmitter unit 222 of the access point 110 shown in FIG. 2. Means for receiving may comprise a receiver, such as the receiver unit 254 of the user terminal 120 depicted in FIG. 2 or the receiver unit 222 of the access point 110 shown in FIG. 2. Means for processing or means for determining may comprise a processing system, which may include one or more processors, such as the RX data processor 270, the TX data processor 288, and/or the controller 280 of the user terminal 120 illustrated in FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
a receiver configured to receive first and second multi-user (MU) packets, to receive, after the first MU packet and before the second MU packet, a first frame comprising a sounding poll (SP) packet for the second MU packet and a first block acknowledgement request (BAR) for the first MU packet and a second frame comprising a null data packet announcement (NDPA) and a second BAR for the first MU packet; and
a transmitter configured to transmit, in response to the first BAR or the second BAR and before the receiver has received the second MU packet, an acknowledgment associated with the first MU packet together with information about a channel over which the second MU packet is expected to be received, wherein the information is generated in response to reception of the SP packet.

2. The apparatus of claim 1, wherein the transmitter is configured to transmit the acknowledgment and the information about the channel in a common frame.

3. The apparatus of claim 2, wherein the common frame is an aggregate media access control (MAC) protocol data unit (A-MPDU).

4. The apparatus of claim 1, wherein the information about the channel comprises channel state information (CSI).

5. The apparatus of claim 1, wherein the transmitter is configured to transmit the acknowledgment together with the information about the channel based on polling.

6. A method for wireless communications, comprising:
receiving a first multi-user (MU) packet;
receiving a second MU packet; and
receiving, after the first MU packet and before the second MU packet, a first frame comprising a sounding poll (SP) packet for the second MU packet and a first block acknowledgement request (BAR) for the first MU packet and a second frame comprising a second BAR for the first MU packet and a null data packet announcement (NDPA); and transmitting, in response to the first BAR or the second BAR and before receiving the second MU packet, an acknowledgment associated with the first MU packet together with information about a channel over which the second MU packet is expected to be received, wherein the information is generated in response to reception of the SP packet.

7. The method of claim 6, wherein the transmitting comprises transmitting the acknowledgment and the information about the channel in a common frame.

8. The method of claim 7, wherein the common frame is an aggregate media access control (MAC) protocol data unit (A-MPDU).

9. The method of claim 6, wherein the information about the channel comprises channel state information (CSI).

10. The method of claim 6, wherein the transmitting comprises transmitting the acknowledgment together with the information about the channel based on sequential responses.

11. An apparatus for wireless communications, comprising:
means for receiving first and second multi-user (MU) packets and means for receiving, after the first MU packet and before the second MU packet, a first frame comprising a sounding poll (SP) packet for the second MU packet and a first block acknowledgement request (BAR) for the first MU packet and a second frame comprising a second BAR for the first MU packet and a null data packet announcement (NDPA); and
means for transmitting, in response to the first BAR or the second BAR and before the means for receiving has received the second MU packet, an acknowledgment associated with the first MU packet together with information about a channel over which the second MU packet is expected to be received, wherein the information is generated in response to reception of the SP packet.

12. The apparatus of claim 11, wherein the means for transmitting is configured to transmit the acknowledgment and the information about the channel in a common frame.

13. The apparatus of claim 12, wherein the common frame is an aggregate media access control (MAC) protocol data unit (A-MPDU).

14. The apparatus of claim 11, wherein the information about the channel comprises channel state information (CSI).

15. The apparatus of claim 11, wherein the means for transmitting is configured to transmit the acknowledgment together with the information about the channel based on sequential responses.

16. A computer-program product for wireless communications, comprising a non-transitory computer-readable medium comprising instructions executable to:
receive a first multi-user (MU) packet;
receive a second MU packet; and
receive, after the first MU packet and before the second MU packet, a first frame comprising a sounding poll (SP) packet for the second MU packet and a first block acknowledgement request (BAR) for the first MU packet and a second frame comprising a second BAR for the first MU packet and a null data packet announcement (NDPA); and
transmit, in response to the first BAR or the second BAR and before receiving the second MU packet, an acknowledgment associated with the first MU packet together with information about a channel over which the second MU packet is expected to be received, wherein the information is generated in response to reception of the SP packet.

17. A wireless node, comprising:
at least one antenna;
a receiver configured to receive, via the at least one antenna, first and second multi-user (MU) packets, to receive, after the first MU packet and before the second MU packet, a first frame comprising a sounding poll (SP) packet for the second MU packet and a first block acknowledgement request (BAR) for the first MU packet and a second frame comprising a second BAR for the first MU packet and a null data packet announcement (NDPA); and
a transmitter configured to transmit, via the at least one antenna in response to the first BAR or the second BAR and before the receiver has received the second MU packet, an acknowledgment associated with the first MU packet together with information about a channel over which the second MU packet is expected to be received, wherein the information is generated in response to reception of the SP packet.

18. A first apparatus for wireless communications, comprising:
a transmitter configured to transmit first and second multi-user (MU) packets to one or more second apparatuses, to transmit, after the first MU packet and before the second MU packet, a first frame comprising a sounding poll (SP) packet for the second MU packet and a first block acknowledgement request (BAR) for the first MU packet and a second frame comprising a second BAR for the first MU packet and a null data packet announcement (NDPA); and
a receiver configured to receive, from at least one of the second apparatuses in response to the first BAR or the second BAR and before the transmitter has transmitted the second MU packet, an acknowledgment associated with the first MU packet together with information about a channel over which the second MU packet is expected to be transmitted, wherein the information is generated in response to reception of the SP packet.

19. The first apparatus of claim 18, wherein the receiver is configured to receive the acknowledgment and the information about the channel in a common frame.

20. The first apparatus of claim 19, wherein the common frame is an aggregate media access control (MAC) protocol data unit (A-MPDU).

21. The first apparatus of claim 18, wherein the information about the channel comprises channel state information (CSI).

22. The first apparatus of claim 18, wherein the receiver is configured to receive the acknowledgment together with the information about the channel based on sequential responses.

23. A method for wireless communications, comprising:
transmitting, from a first apparatus, first and second multi-user (MU) packets to one or more second apparatuses, transmitting, after the first MU packet and before the second MU packet, a first frame comprising a sounding poll (SP) packet for the second MU packet and a first block acknowledgement request (BAR) for the first MU packet and a second frame comprising a second BAR for the first MU packet and a null data packet announcement (NDPA); and
receiving, from at least one of the second apparatuses in response to the first BAR or the second BAR and before transmitting the second MU packet, an acknowledgment associated with the first MU packet together with information about a channel over which the second MU packet is expected to be transmitted, wherein the information is generated in response to reception of the SP packet.

24. The method of claim 23, wherein the receiving comprises receiving the acknowledgment and the information about the channel in a common frame.

25. The method of claim 24, wherein the common frame is an aggregate media access control (MAC) protocol data unit (A-MPDU).

26. The method of claim 23, wherein the information about the channel comprises channel state information (CSI).

27. The method of claim 23, wherein the receiving comprises receiving the acknowledgment together with the information about the channel based on polling.

28. A first apparatus for wireless communications, comprising:
    means for transmitting first and second multi-user (MU) packets to one or more second apparatuses, transmitting, after the first MU packet and before the second MU packet, a first frame comprising a sounding poll (SP) packet for the second MU packet and a first block acknowledgement request (BAR) for the first MU packet and a second frame comprising a second BAR for the first MU packet and a null data packet announcement (NDPA); and
    means for receiving, from at least one of the second apparatuses in response to the first BAR or the second BAR and before the means for transmitting has transmitted the second MU packet, an acknowledgment associated with the first MU packet together with information about a channel over which the second MU packet is expected to be transmitted, wherein the information is generated in response to reception of the SP packet.

29. The first apparatus of claim 28, wherein the means for receiving is configured to receive the acknowledgment and the information about the channel in a common frame.

30. The first apparatus of claim 29, wherein the common frame is an aggregate media access control (MAC) protocol data unit (A-MPDU).

31. The first apparatus of claim 28, wherein the information about the channel comprises channel state information (CSI).

32. The first apparatus of claim 28, wherein the means for receiving is configured to receive the acknowledgment together with the information about the channel based on polling.

33. A computer-program product for wireless communications, comprising a non-transitory computer-readable medium comprising instructions executable to:
    transmit, from a first apparatus, first and second multi-user (MU) packets to one or more second apparatuses; and
    transmit, after the first MU packet and before the second MU packet, a first frame comprising a sounding poll (SP) packet for the second MU packet and a first block acknowledgement request (BAR) for the first MU packet and a second frame comprising a second BAR for the first MU packet and a null data packet announcement (NDPA); and
    receive, from at least one of the second apparatuses in response to the first BAR or the second BAR and before transmitting the second MU packet, an acknowledgment associated with the first MU packet together with information about a channel over which the second MU packet is expected to be transmitted, wherein the information is generated in response to reception of the SP packet.

34. An access point, comprising:
    at least one antenna;
    a transmitter configured to transmit, via the at least one antenna, first and second multi-user (MU) packets to one or more apparatuses, to transmit, after the first MU packet and before the second MU packet, a first frame comprising a sounding poll (SP) packet for the second MU packet and a first block acknowledgement request (BAR) for the first MU packet and a second frame comprising a second BAR for the first MU packet and a null data packet announcement (NDPA); and
    a receiver configured to receive, from at least one of the one or more apparatuses via the at least one antenna in response to the first BAR or the second BAR and before the transmitter has transmitted the second MU packet, an acknowledgment associated with the first MU packet together with information about a channel over which the second MU packet is expected to be transmitted, wherein the information is generated in response to reception of the SP packet.

* * * * *